US009671634B2

(12) United States Patent  (10) Patent No.: US 9,671,634 B2
Sato et al.  (45) Date of Patent: Jun. 6, 2017

(54) SUBSTRATE OF DISPLAY DEVICE, DISPLAY DEVICE AND MANUFACTURING METHOD FOR DISPLAY PANEL

(71) Applicant: JAPAN DISPLAY INC., Tokyo (JP)

(72) Inventors: Takao Sato, Funabashi (JP); Saori Sugiyama, Chosei-gun (JP)

(73) Assignee: JAPAN DISPLAY INC., Tokyo (JP)

( * ) Notice: Subject to any disclaimer, the term of this patent is extended or adjusted under 35 U.S.C. 154(b) by 80 days.

(21) Appl. No.: 14/752,152

(22) Filed: Jun. 26, 2015

(65) Prior Publication Data

US 2015/0293399 A1 Oct. 15, 2015

Related U.S. Application Data

(62) Division of application No. 13/352,361, filed on Jan. 18, 2012, now Pat. No. 9,097,926.

(30) Foreign Application Priority Data

Jan. 20, 2011 (JP) .................................. 2011-009728

(51) Int. Cl.
G02F 1/1333 (2006.01)
G02F 1/1335 (2006.01)
G02F 1/1339 (2006.01)

(52) U.S. Cl.
CPC ...... *G02F 1/133351* (2013.01); *G02F 1/1339* (2013.01); *G02F 1/133512* (2013.01)

(58) Field of Classification Search
CPC .................... G02F 1/133351; G02F 1/133512
See application file for complete search history.

(56) References Cited

U.S. PATENT DOCUMENTS 6,057,900 A 5/2000 Ono et al.
7,102,710 B2 9/2006 Yi et al.
(Continued)

FOREIGN PATENT DOCUMENTS

JP H10-325951 A 12/1998
JP 2008-176344 A 7/2008
WO 2008078425 A1 7/2008

OTHER PUBLICATIONS

Office Action dated Sep. 16, 2014 regarding a counterpart Japanese patent application No. 2011-009728. Partial English translation is attached.

(Continued)

*Primary Examiner* — Kendrick Hsu
(74) *Attorney, Agent, or Firm* — Typha IP LLC

(57) ABSTRACT

A display device substrate includes a transparent substrate arranged in parallel with a face on which an image is displayed and a light-shielding film partially formed on the transparent substrate for shielding light. The light-shielding film has, at a portion of the transparent substrate along an edge thereof on at least one side, a low light-shielding portion having a lower light-shielding capability. The low light-shielding portion is formed with a smaller thickness than that of the other portion in the light-shielding film. With this configuration, even when, in a gang printing display panel in which a plurality of display panels each having the display device substrate are arranged, the light-shielding films of the display panels adjacent to each other are formed continuously, cutting can be performed more easily at a position to be cut.

7 Claims, 9 Drawing Sheets

(56) References Cited

U.S. PATENT DOCUMENTS

2006/0176439 A1     8/2006   Tashiro et al.
2008/0198287 A1     8/2008   Kim et al.
2009/0268130 A1*  10/2009   Yeh ...................... G02F 1/1339
                                                                         349/73
2009/0316090 A1   12/2009   Fujikawa et al.

OTHER PUBLICATIONS

Office Action dated Apr. 28, 2015 regarding a counterpart Japanese patent application No. 2011-009728. Partial English translation is attached.

* cited by examiner

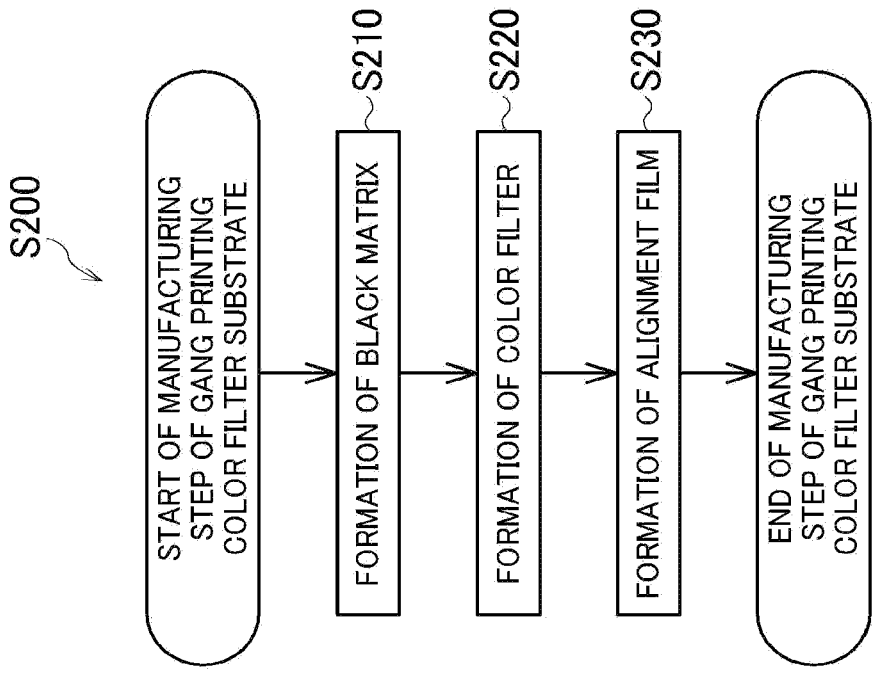
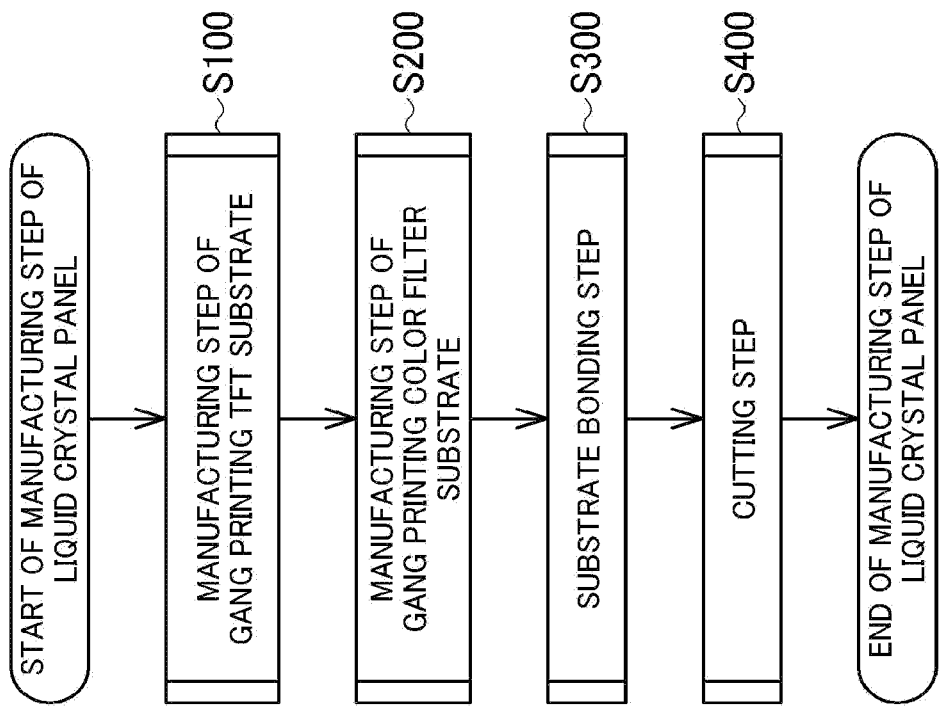

SUBSTRATE OF DISPLAY DEVICE, DISPLAY DEVICE AND MANUFACTURING METHOD FOR DISPLAY PANEL

CROSS-REFERENCE TO RELATED APPLICATION

This is a divisional of U.S. patent application Ser. No. 13/352,361, filed on Jan. 18, 2012, which claims priority from Japanese Patent Application No. 2011-009728 filed on Jan. 20, 2011, in the Japanese Patent Office, the contents of which are incorporated herein by reference.

BACKGROUND OF THE INVENTION

1. Field of the Invention

The present invention relates to a display device substrate, a display device, and a manufacturing method for a display panel.

2. Description of the Related Art

Display devices, such as liquid crystal display devices, have been widely used as display devices of information communication terminals, such as computers, or television receivers. In the liquid crystal display device, the alignment of liquid crystal molecules sealed between two substrates of a liquid crystal panel is changed to change the degree of transmittance of light radiated from a backlight to the liquid crystal panel, whereby an image is displayed.

JP 10-325951 A discloses that in a picture-frame area which is an area located just outside a pixel area for displaying an image, a light-shielding film called a black matrix is extended to the edge of a color filter substrate so that light radiated from a backlight does not leak.

SUMMARY OF THE INVENTION

Taking a liquid crystal panel of a liquid crystal display device as an example, a gang printing liquid crystal panel in which a plurality of screens are arranged is integrally manufactured and cut along a scribe line, whereby the single liquid crystal panel is manufactured in most cases. However, when the black matrix is extended to the edge of the color filter substrate in each of the liquid crystal panels as described above, the black matrices of the liquid crystal panels adjacent to each other become continuous, making it hard to visually recognize the scribe line as a cutting line. This causes an additional production time to confirm the position of the scribe line in the manufacturing step, and results in a reduction in yield.

The invention has been made in view of the circumstance described above, and it is an object of the invention to provide a display device substrate in which, in a gang printing display-device substrate in which a plurality of display device substrates, such as liquid crystal panels, are arranged, even when light-shielding films, such as black matrices, of the display device substrates adjacent to each other are continuously formed, cutting can be more easily performed at a position to be cut; a display device; and a manufacturing method for a display panel.

A display device substrate according to the invention includes: a transparent substrate arranged in parallel with a face on which an image is displayed; and a light-shielding film partially formed on the transparent substrate for shielding light, wherein the light-shielding film has a light-shielding portion and a low light-shielding portion which is formed at a portion of the transparent substrate along an edge thereof on at least one side and whose light-shielding capability is lower than that of the light-shielding portion.

Moreover, in the display device substrate according to the invention, the film thickness of the low light-shielding portion may be made smaller than that of the light-shielding portion to obtain the low light-shielding portion.

Moreover, in the display device substrate according to the invention, a film which forms the low light-shielding portion may be formed of a material different from a material of which the light-shielding portion is formed, and may be formed of a blue color filter.

Moreover, in the display device substrate according to the invention, the low light-shielding portion may be formed discontinuously along the edge on the at least one side.

A display device according to the invention includes: a display device substrate; and a backlight radiating light to the display device substrate, wherein the display device substrate has a transparent substrate arranged in parallel with a face on which an image is displayed and a light-shielding film partially formed on the transparent substrate for shielding light, and the light-shielding film has a light-shielding portion and a low light-shielding portion which is formed at a portion of the transparent substrate along an edge thereof on at least one side and whose light-shielding capability is lower than that of the light-shielding portion.

A manufacturing method for a display panel according to the invention includes the steps of forming, on a transparent substrate, a light-shielding film having a light-shielding portion which shields light and a low light-shielding portion whose light-shielding capability is lower than that of the light-shielding portion; and cutting at the low light-shielding portion.

Moreover, the manufacturing method for a display panel according to the invention further includes the step of bonding a thin film transistor substrate having thin film transistors formed on at least one of faces with the transparent substrate so as to seal a liquid crystal composition between the thin film transistor substrate and the transparent substrate, wherein in the cutting step, both the transparent substrate and the thin film transistor substrate may be simultaneously cut at the low light-shielding portion of the transparent substrate.

Moreover, in the manufacturing method for a display panel according to the invention, the film thickness of the low light-shielding portion may be made smaller than that of the light-shielding portion to obtain the low light-shielding portion.

Moreover, in the manufacturing method for a display panel according to the invention, a film which forms the low light-shielding portion may be formed of a material different from a material of which the light-shielding portion is formed, and may be formed of a blue color filter.

Moreover, in the manufacturing method for a display panel according to the invention, the low light-shielding portion may be formed discontinuously along a predetermined line, and in the cutting step, cutting may be performed along the predetermined line.

BRIEF DESCRIPTION OF THE DRAWINGS

FIG. 1 is a flowchart showing a manufacturing step of liquid crystal panels according to first and second embodiments.

FIG. 2 is a flowchart showing in detail a manufacturing step of a gang printing color filter substrate in FIG. 1.

DETAILED DESCRIPTION OF THE INVENTION

Figure 3:
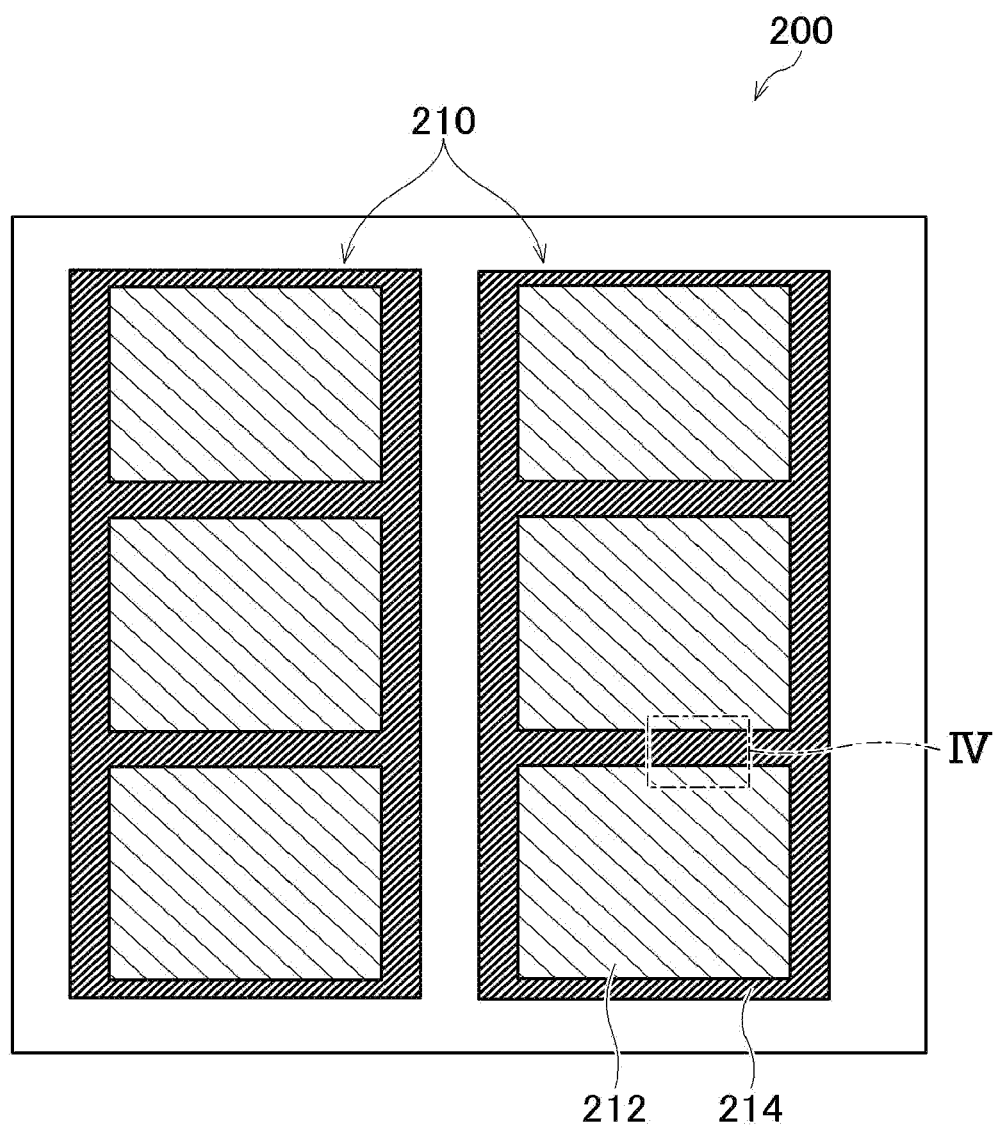
FIG. 3 shows the manner of arrangement of black matrices of the gang printing color filter substrate according to the first embodiment manufactured by the manufacturing step of the gang printing color filter substrate in FIG. 2.

Hereinafter, embodiments of the invention will be described with reference to the drawings. In the drawings, the same or equivalent constituents are denoted by the same reference and numeral signs, and repetitive description is omitted.

First Embodiment

FIG. 1 is a flowchart showing manufacturing steps of a liquid crystal panel as a display panel. The manufacturing steps are a part of a manufacturing method for a liquid crystal display device 100 which will be described later. As shown in the flowchart, the manufacturing step of the liquid crystal panel includes, in order, a manufacturing step of a gang printing TFT (Thin Film Transistor) substrate S100, a manufacturing step of a gang printing color filter substrate S200, a substrate bonding step S300, and a cutting step S400. In the manufacturing step of the gang printing TFT substrate S100, semiconductor circuits, an alignment film, and the like are formed on a glass substrate for manufacturing a gang printing liquid crystal panel 300 where a plurality of screens of liquid crystal display devices are arranged, whereby a gang printing TFT substrate 350 is manufactured. In a similar manner, in the manufacturing step of the gang printing color filter substrate S200, R (red), G (green), and B (blue) color resist films and the like are formed on a gang printing glass substrate where a plurality of screens of the plurality of liquid crystal display devices are arranged, whereby a gang printing color filter substrate 200 is manufactured. In the substrate bonding step S300, the gang printing TFT substrate 350 and the gang printing color filter substrate 200 are bonded together, and a liquid crystal composition 328 is injected therebetween, whereby the gang printing liquid crystal panel 300 is assembled. In the cutting step S400, the gang printing liquid, crystal panel 300 is cut.

FIG. 2 is a flowchart showing in detail the manufacturing step of the gang printing color filter substrate S200 in FIG. 1. FIG. 3 schematically shows the manner of arrangement of black matrices 210 as light-shielding films of the gang printing color filter substrate 200 manufactured by the manufacturing step of the gang printing color filter substrate S200. As shown in the flowchart of FIG. 2, first at Step S210 in the manufacturing step of the color filter substrate S200, the black matrix 210 as a light-shielding film for preventing light from leaking around each pixel and around a pixel area is formed, and next at Step S220, R, G, and B color resists are applied within a pixel frame formed by a pixel area black matrix portion 212 as a black matrix within the pixel area to form color filters. Finally at Step S230, an alignment film for aligning liquid crystal in one direction is formed.

FIG. 3 shows the manner of arrangement of the black matrices 210 of the gang printing color filter substrate 200 manufactured by the manufacturing step of the color filter substrate S200 in FIG. 2. The black matrix 210 of the gang printing color filter substrate 200 has the pixel area black matrix portion 212 having openings each at a pixel in a display area in which pixels are arranged, a picture-frame area black matrix portion 214 around the pixel area, and a low light-shielding black matrix portion 215 which will be described later. As shown in the drawing, the gang printing color filter substrate 200 includes six liquid crystal panel screens in the embodiment.

Figure 4:
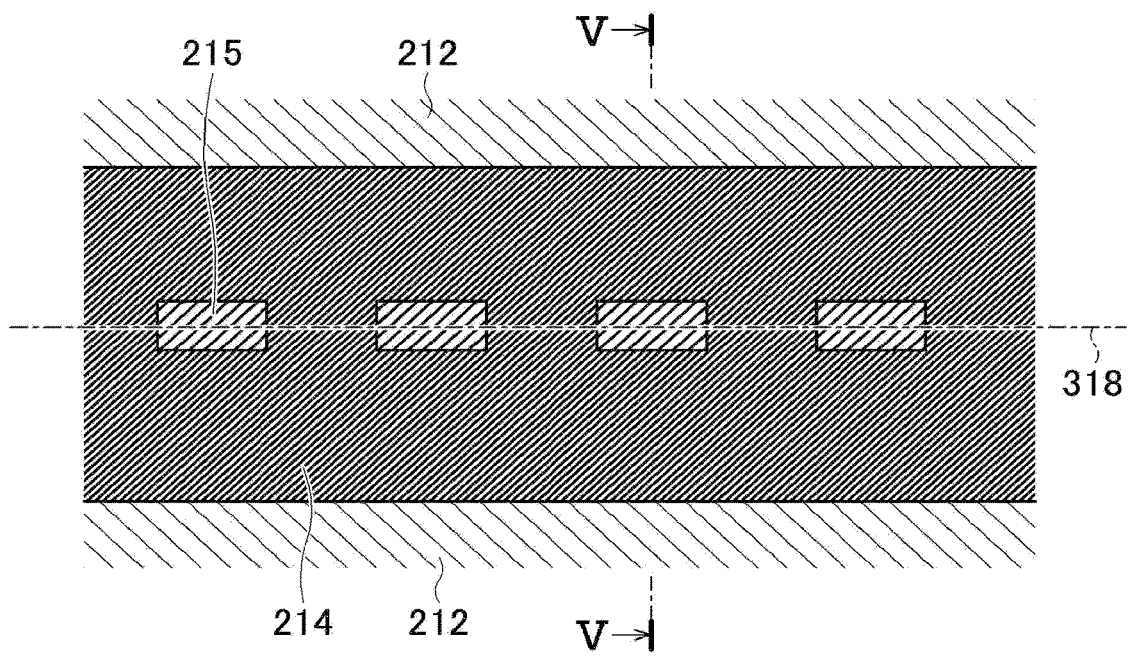
FIG. 4 is an enlarged view of a portion indicated by IV in FIG. 3.

FIG. 4 shows an enlarged view of a portion indicated by IV in FIG. 3. As shown in FIG. 4, the low light-shielding black matrix portion 215 is formed discontinuously on a scribe line (cutting line) 318 along which cutting is performed later in the cutting step S400, so as to be surrounded by the picture-frame area black matrix portion 214. The film thickness of the low light-shielding black matrix portion 215 is reduced so that its light-shielding effect is lower than that of the picture-frame area black matrix portion 214.

Figure 5:
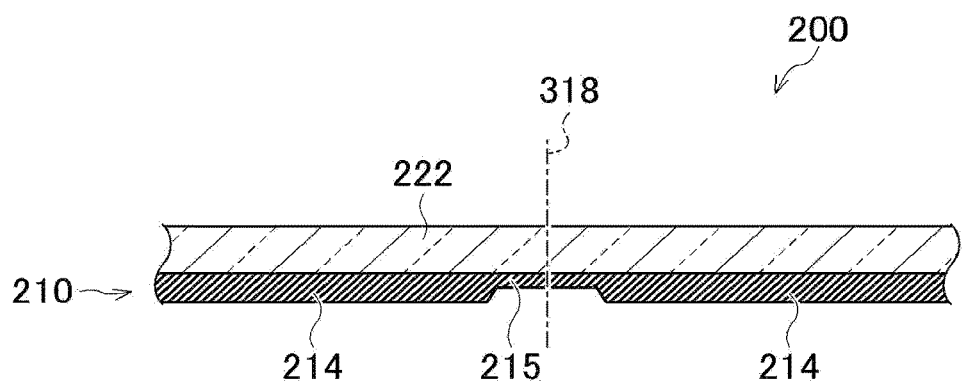
FIG. 5 is a cross-sectional view taken along line V-V in FIG. 4.

FIG. 5 shows a section taken along line V-V in FIG. 4. As shown in FIG. 5, the black matrix 210 is formed on a glass substrate 222, and the black matrix 210 has, in the picture-frame area portion of the gang printing color filter substrate 200, the low light-shielding black matrix portion 215 in which the black matrix is formed so as to have a smaller thickness than that of the picture-frame area black matrix portion 214. By reducing the thickness, a light-shielding effect lower than that of the picture-frame area black matrix portion 214 located around the low light-shielding black matrix portion 215 is realized. As a forming method for partially reducing the thickness in this manner, it is possible to use a forming method in which, for example, a black matrix is formed by performing a well-known photolithography process twice, where in the second lithography process, a mask is applied to the low light-shielding black matrix portion 215 so as not to form a black matrix.

Figure 6:
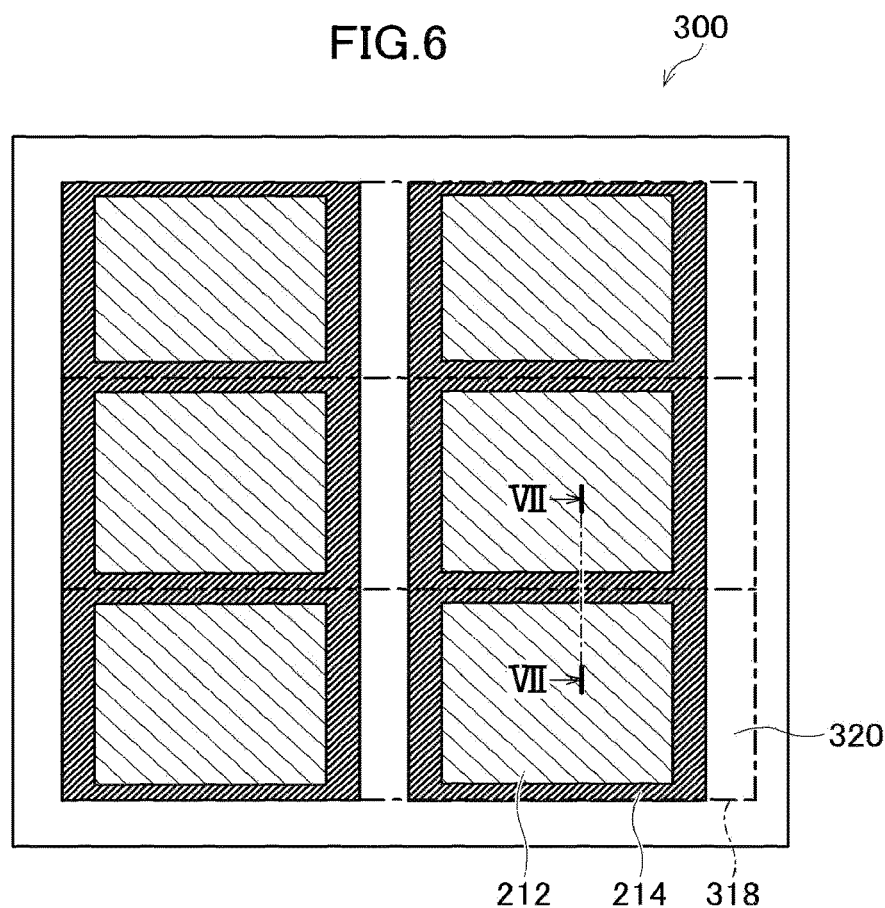
FIG. 6 shows a gang printing liquid crystal panel according to the first embodiment after a substrate bonding step in FIG. 1.

FIG. 6 shows the gang printing liquid crystal, panel 300 after the substrate bonding step S300 in FIG. 1. The gang printing liquid crystal panel 300 is supposed to be cut in the cutting step S400 along the scribe line (cutting line) 318, whereby six liquid crystal panels 310 each of which is used for the single liquid crystal display device 100 can be obtained. While the gang printing TFT substrate 350 is cut so as to keep a drive circuit area 320 in which a drive circuit and the like are arranged, the gang printing color filter substrate 200 is cut so as to cut off the drive circuit area 320 so that the four sides of the picture-frame area black matrix portion 214 would be the outer edges.

Figure 7:
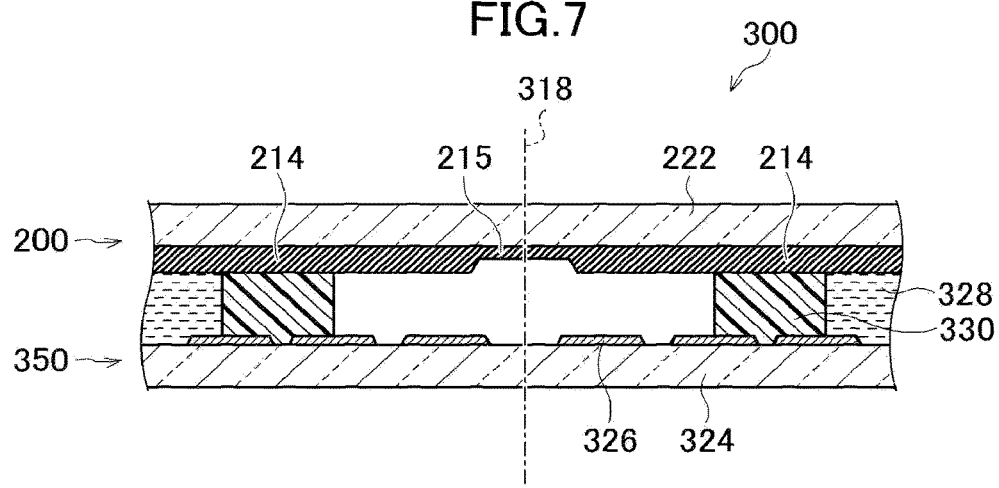
FIG. 7 is a cross-sectional view taken along line VII-VII in FIG. 6.

FIG. 7 shows a section taken along line VII-VII in FIG. 6. As shown in the drawing, the gang printing liquid crystal panel 300 is formed by bonding the gang printing TFT substrate 350 with the gang printing color filter substrate 200 via a sealing material 330 arranged outside the pixel area and injecting the liquid crystal material 328 on the pixel area side of the sealing material 330. Moreover, a TFT array 326 is formed on a glass substrate 324 of the gang printing TFT substrate 350.

In the same manner as in FIG. 5, the scribe line 318 passes through the low light-shielding black matrix portion 215 of the black matrix 210. In the cutting step S400, a not-shown scribe wheel passes on the scribe line 318 to form a V-shaped groove in the glass substrate 222 or 324, and cutting by folding is performed. Because of the presence of the low light-shielding black matrix portion 215, confirmation of the scribe line 318 is easily made with light from the opposite face of the gang printing liquid crystal panel 300 on which the scribe wheel is put. The scribe wheel is put so as to pass on the low light-shielding black matrix portion 215 to cut the gang printing liquid crystal panel 300. Accordingly, confirmation work and the like in the cutting step can be made more efficient, making it possible to improve yield. In the embodiment, when cutting is performed along the scribe line on the low light-shielding black matrix portion 215, both the gang printing TFT substrate 350 and the gang printing color filter substrate 200 are cut at one time.

Figure 8:
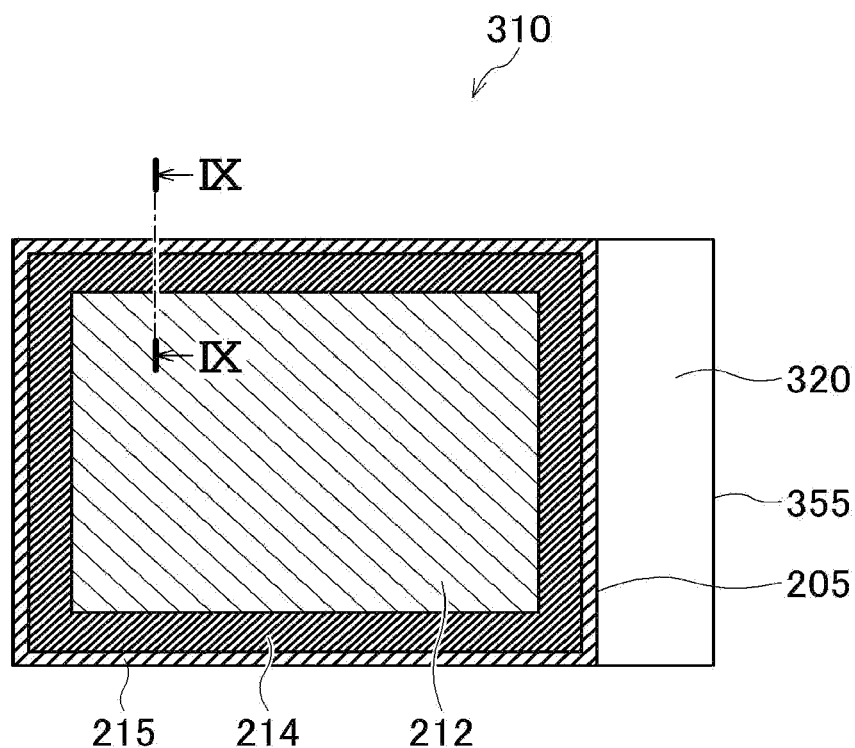
FIG. 8 schematically shows a liquid crystal panel according to the first embodiment cut along a scribe line.

FIG. 8 schematically shows the liquid crystal panel 310 cut along the scribe line 318. As shown in the drawing, the gang printing color filter substrate 200 and the gang printing TFT substrate 350 become, after cutting, a color filter substrate 205 and a TFT substrate 355, respectively. For the purpose of understandability, hatching in the low light-shielding black matrix portion 215 in FIG. 8 is continuously applied to the low light-shielding black matrix portion 215 along the sides of the color filter substrate 205 after cutting. Actually, however, the low light-shielding black matrix portion 215 is discontinuously formed as shown in FIG. 4. Moreover, on the TFT substrate 355, the drive circuit area 320 in which a drive circuit and the like are arranged is provided.

Figure 9:
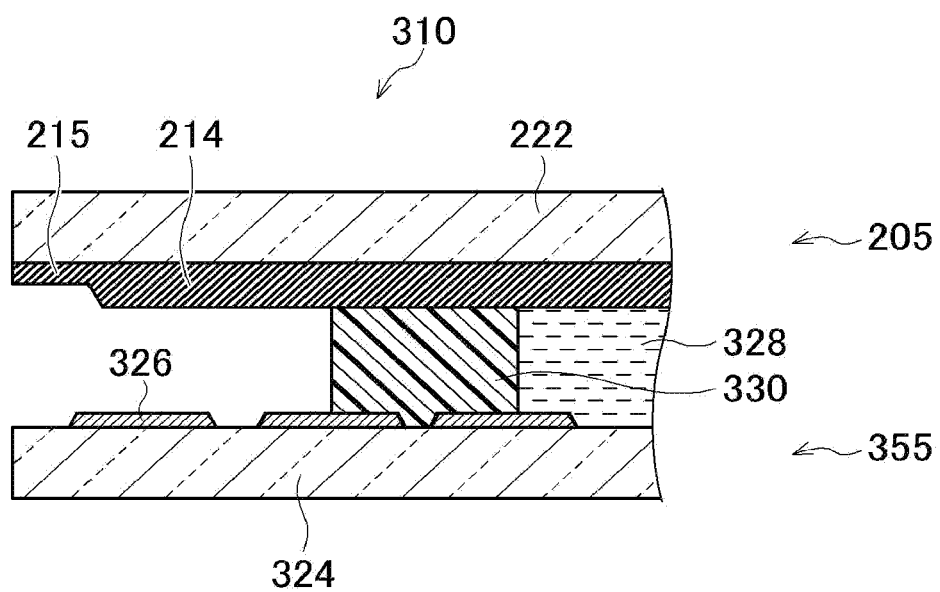
FIG. 9 is a cross-sectional view taken along line IX-IX in FIG. 8.

FIG. 9 shows a section taken along line IX-IX in FIG. 8. As shown in the drawing, since the liquid crystal panel 310 is cut at the low light-shielding black matrix portion 215, the low light-shielding black matrix portion 215 is discontinuously formed at the edge.

Figure 10:
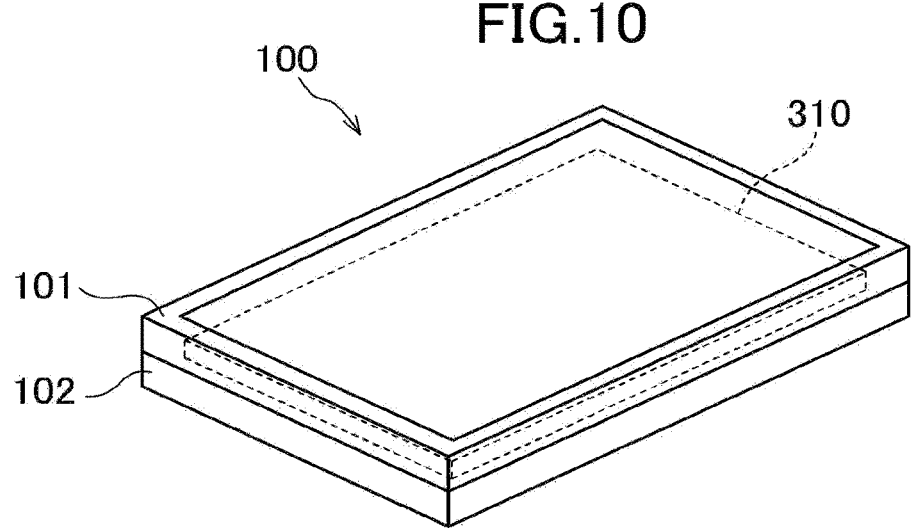
FIG. 10 schematically shows a liquid crystal display device including the liquid crystal panel shown in FIGS. 8 and 9.

FIG. 10 schematically shows the liquid crystal, display device 100 including the liquid crystal panel 310 shown in FIGS. 8 and 9. The liquid crystal display device 100 includes the liquid crystal panel 310, an upper frame 101 and a lower frame 102 which fix the liquid crystal panel 310 so as to interpose the liquid crystal panel 310 therebetween, a not-shown backlight which radiates light to the display face side via the liquid crystal panel 310, and a not-shown circuit board including circuit elements which create information to be displayed.

As described above, in the liquid crystal display device 100 and the liquid crystal panel 310 in the embodiment, even when the black matrices 210 of the liquid crystal panels 310 adjacent to each other are continuously formed, cutting can be more easily performed at a position to be cut.

Second Embodiment

A liquid crystal panel 610 according to a second embodiment of the invention will be described. For describing a manufacturing step, the flowcharts of FIGS. 1 and 2 are used in the same manner as in the first embodiment.

Figure 11:
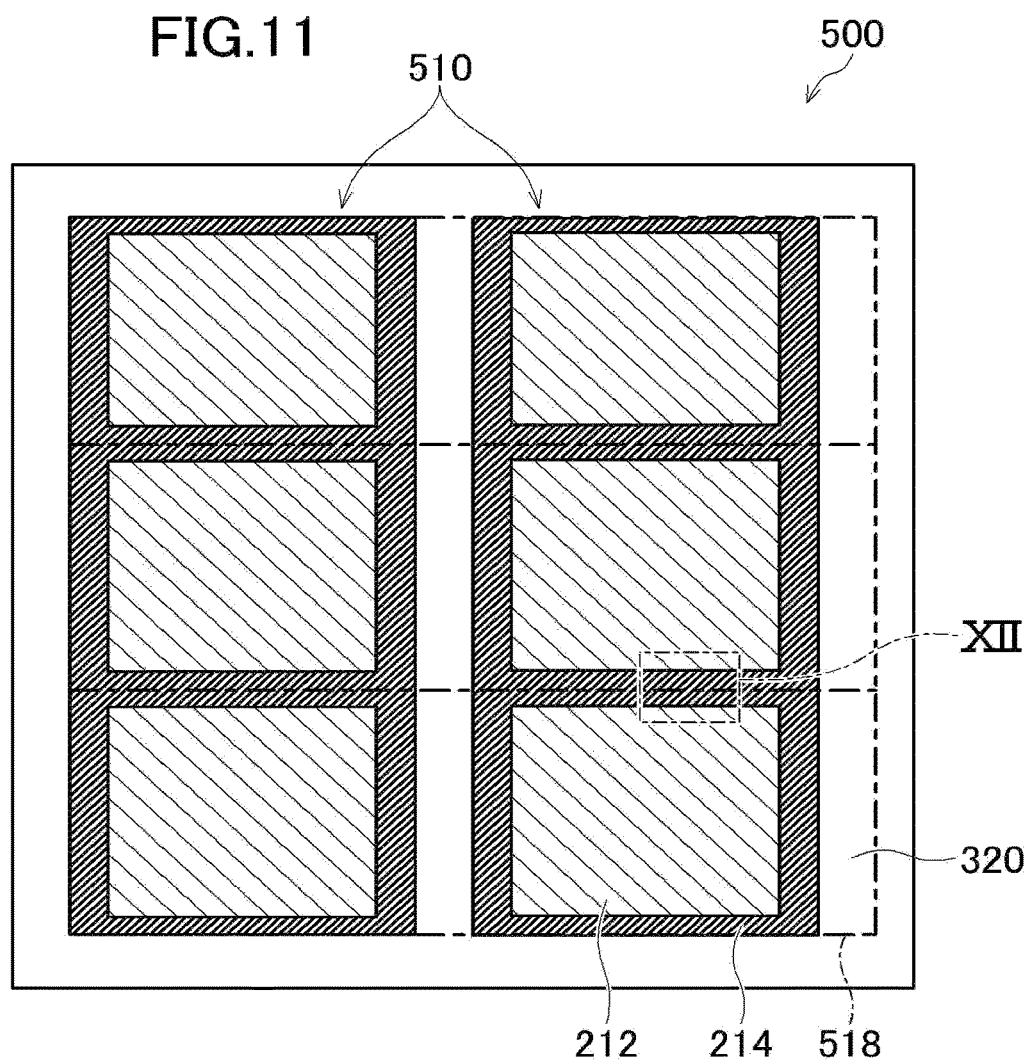
FIG. 11 shows a gang printing liquid crystal panel according to a second embodiment after the substrate bonding step in FIG. 1, including the arrangement of black matrices formed in a gang printing color filter substrate.

FIG. 11 shows a gang printing liquid crystal panel 500 after the substrate bonding step S300 in FIG. 1, including the arrangement of black matrices 510 formed in a gang printing color filter substrate 550. In the same manner as in the first embodiment, the black matrix 510 has the pixel area black matrix portion 212 having openings each at a pixel in the display area in which pixels are arranged, the picture-frame area black matrix portion 214 around the pixel area, and a low light-shielding resist portion 515 which will be described later. The gang printing liquid crystal panel 500 is cut along a scribe line (cutting line) 518 in the cutting-step S400, whereby the six liquid crystal panels 610 (refer to FIG. 14) each of which is used for a single liquid crystal display device can be obtained. In the same manner as in the first embodiment, as for the drive circuit area 320 in which a drive circuit and the like are arranged, the gang printing TFT substrate 350 is cut so as to keep the drive circuit area 320. However, the gang printing color filter substrate 550 is cut so as to cut off the drive circuit area 320 so that the four sides of the picture-frame area black matrix portion 214 would be outer edges.

Figure 12:
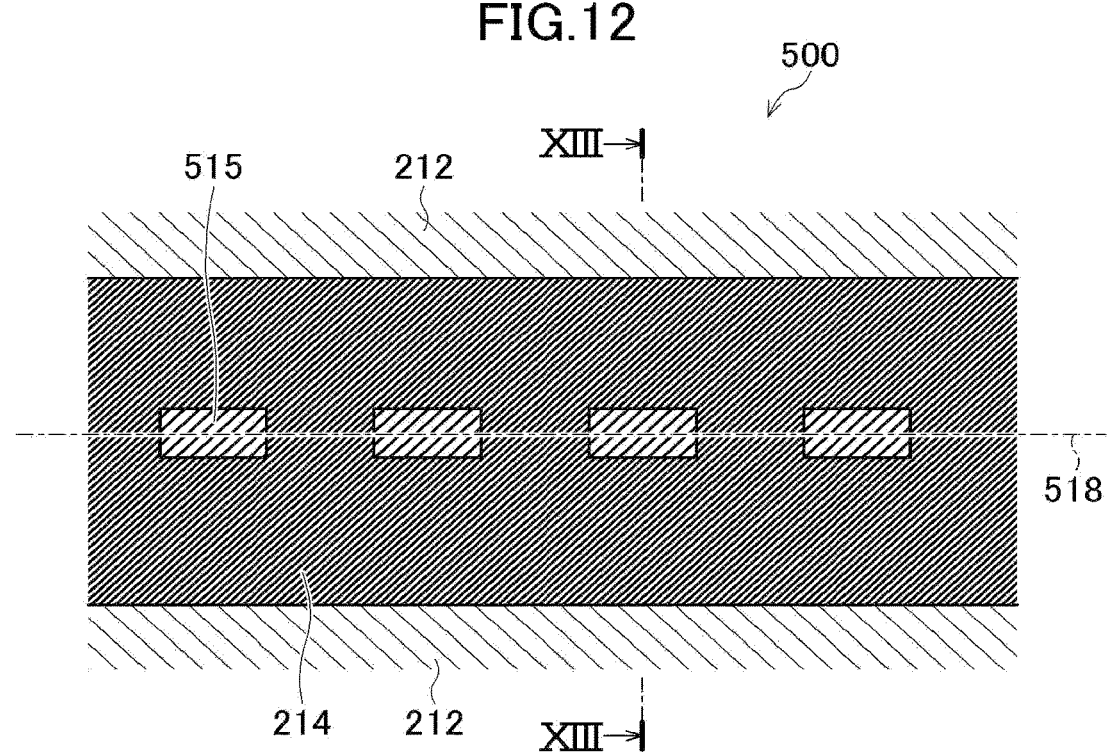
FIG. 12 is an enlarged view of a portion indicated by XII in FIG. 11.

FIG. 12 is an enlarged view of a portion indicated by XII in FIG. 11. As shown in FIG. 12, the low light-shielding resist portion 515 is discontinuously formed on the scribe line (cutting line) 518 for cutting later in the cutting step S400, so as to be surrounded by the picture-frame area black matrix portion 214. The low light-shielding resist portion 515 is formed by depositing a blue resist which forms a blue filter of color filters. In this case, the blue resist is used because blue is less likely to be recognized by a person even if light leakage occurs.

Figure 13:
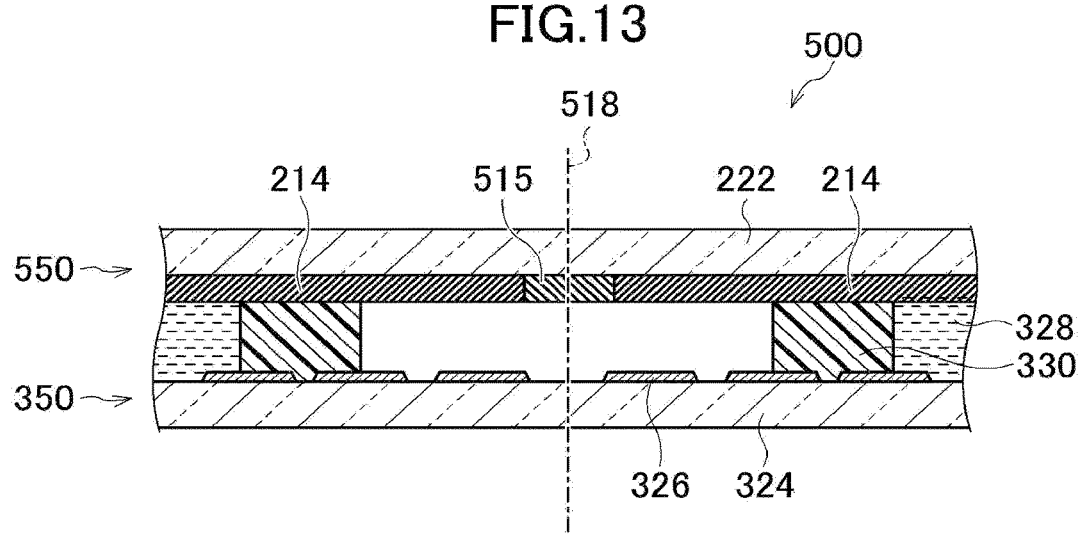
FIG. 13 is a cross-sectional view taken along line XIII-XIII in FIG. 12.

FIG. 13 shows a section taken along line XIII-XIII in FIG. 12. As shown in the drawing, in the same manner as in the first embodiment, the gang printing liquid crystal panel 500 is formed by bonding the gang printing TFT substrate 350 with the gang printing color filter substrate 550 via the sealing material 330 arranged outside the pixel area and injecting the liquid crystal material 328 on the pixel area side of the sealing material 330. Moreover, the TFT array 326 is formed on the glass substrate 324 of the gang printing TFT substrate 350.

Figure 14:
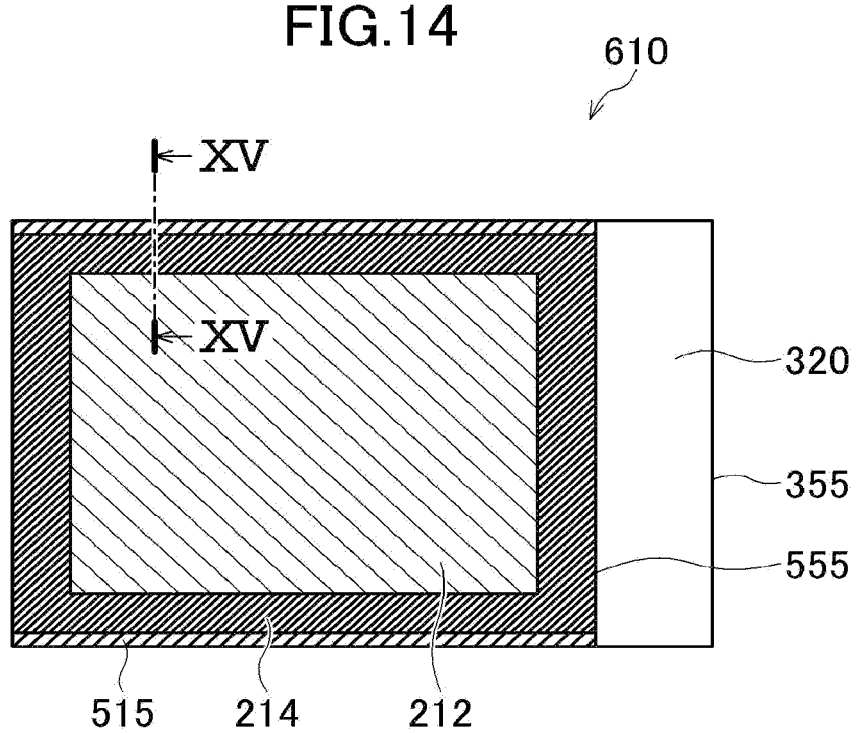
FIG. 14 schematically shows a liquid crystal panel according to the second embodiment cut along a scribe line.

FIG. 14 schematically shows the liquid crystal panel 610 cut along the scribe line 518. As shown in the drawing, the gang printing color filter substrate 550 and the gang printing TFT substrate 350 become, after cutting, a color filter substrate 555 and the TFT substrate 355, respectively. The low light-shielding resist portion 515 is formed only at a portion where the black matrices 510 of the liquid crystal panels 610 adjacent to each other has continuously been formed in the picture-frame portion. For the purpose of understandability, hatching in the low light-shielding resist portion 515 in FIG. 14 is continuously applied to the low light-shielding resist portion 515. Actually, however, the low light-shielding resist portion 515 is discontinuously formed as shown in FIG. 12. Moreover, on the TFT substrate 355, the drive circuit area 320 in which a drive circuit and the like are arranged is provided.

Figure 15:
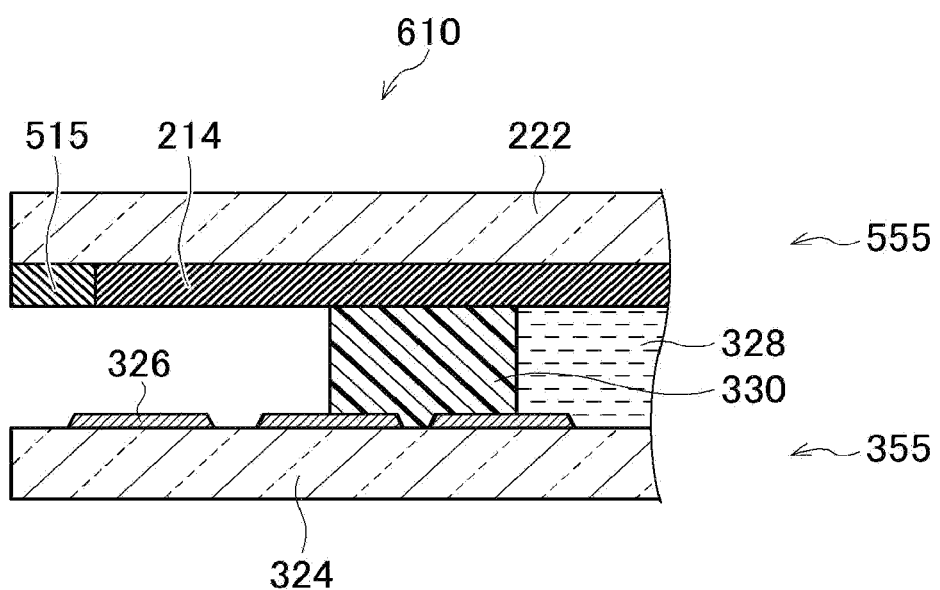
FIG. 15 is a cross-sectional view taken along line XV-XV in FIG. 14.

FIG. 15 shows a section taken along line XV-XV in FIG. 14. As shown in the drawing, since the liquid crystal panel 610 is cut at the low light-shielding resist portion 515, the low light-shielding resist portion 515 exists discontinuously at the edge.

The manufacturing step of the liquid crystal panel 610 according to the embodiment has the same flow as that of the flowcharts of FIGS. 1 and 2. However, in the step of forming the black matrix at Step S210 in FIG. 2, the process for forming the thin black matrix is not included because of the absence of the low light-shielding black matrix portion 215, and therefore, the black matrix is not formed at a portion where the low light-shielding resist portion 515 is formed. Moreover, in the step of forming the color filter at Step S220, when a blue resist is formed at a blue pixel in the pixel area, the blue resist is formed also at the low light-shielding resist portion 515.

In the same manner as in the first embodiment, the liquid crystal panel 610 of the embodiment can be used for a liquid crystal display device as shown in FIG. 10.

Accordingly, in the liquid crystal panel 610 of the embodiment, even when the black matrices 510 of the liquid crystal panels 610 adjacent to each other are continuously formed, cutting can be more easily performed at a position to be cut.

Figure 16:
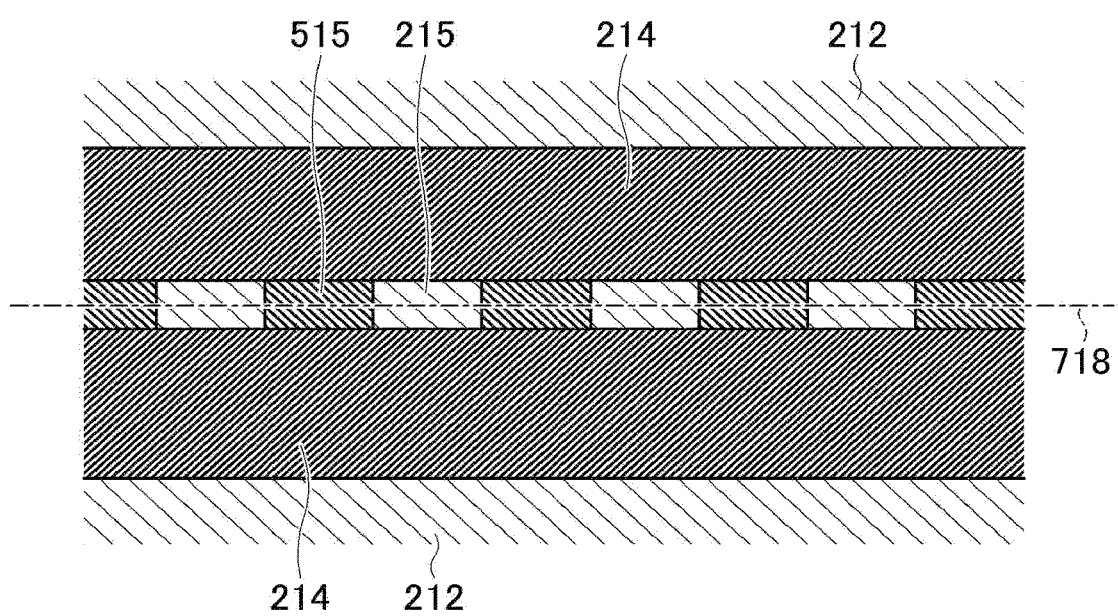
FIG. 16 shows a modified example in which a low light-shielding black matrix portion and a low light-shielding resist portion are alternately arranged on a scribe line.

In the first and second embodiments, the low light-shielding black matrix portion 215 or the low light-shielding resist portion 515 is provided as a low light-shielding portion. However, as shown in FIG. 16, both the low light-shielding black matrix portion 215 and the low light-shielding resist portion 515 may be alternately formed on a scribe line 718.

Moreover, in the first and second embodiments, the low light-shielding black matrix portion 215 or the low light-shielding resist portion 515 as a low light-shielding portion is formed discontinuously on the scribe line. However, the low light-shielding black matrix portion 215 or the low light-shielding resist portion 515 may be continuously formed.

Moreover, in the first and second embodiments, the liquid crystal display device has been described by way of example. However, the invention can be used also for a display device substrate such as a liquid crystal panel in which slits for performing 3D display by a so-called parallax barrier system are formed, or a display device substrate used for a touch panel.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A manufacturing method for a display panel, comprising the steps of:
    forming, on a transparent substrate, a light-shielding film having a light-shielding portion which shields light and a low light-shielding portion whose light-shielding capability is lower than that of the light-shielding portion; and
    cutting at the low light-shielding portion,
    wherein forming the light-shielding film includes reducing the film thickness of the low light-shielding portion so that the film thickness of the low light-shielding portion is greater than zero and smaller than the film thickness of the light-shielding portion.

2. The manufacturing method for a display panel according to claim 1, further comprising the step of bonding a thin film transistor substrate having thin film transistors formed on at least one of faces with the transparent substrate so as to seal a liquid crystal composition,
    wherein in the cutting step, both the transparent substrate and the thin film transistor substrate are simultaneously cut at the low light-shielding portion of the transparent substrate.

3. The manufacturing method for a display panel according to claim 1, wherein
    the low light-shielding portion is formed discontinuously along a predetermined line, and
    in the cutting step, cutting is performed along the predetermined line.

4. The manufacturing method for a display panel according to claim 1, wherein
    forming the light-shielding film includes performing a photolithography process twice, the light-shielding film includes a first light-shielding film and a second light-shielding film,
    the light-shielding portion is a portion that includes the first light-shielding film and the second light-shielding film in a stacked configuration, and
    the low light-shielding portion is a portion that includes only one of the first light-shielding film and the second light-shielding film.

5. The manufacturing method for a display panel according to claim 4, wherein
    the low light-shielding portion is formed discontinuously along a predetermined line, and cutting at the low light-shielding portion includes cutting along the predetermined line.

6. The manufacturing method for a display panel according to claim 5, wherein
    the light-shielding film further includes an opening portion arranged on a discontinuous region between the low light-shielding portion.

7. The manufacturing method for a display panel according to claim 1, wherein
    a blue color filter fills in the opening portion.

* * * * *